US012347591B2

(12) United States Patent
Jin et al.

(10) Patent No.: US 12,347,591 B2
(45) Date of Patent: Jul. 1, 2025

(54) METHOD FOR IMPROVING MAGNETIC PROPERTIES OF CERIUM-YTTRIUM-RICH RARE EARTH PERMANENT MAGNET

(71) Applicant: Zhejiang University, Hangzhou (CN)

(72) Inventors: Jiaying Jin, Hangzhou (CN); Mi Yan, Hangzhou (CN); Wang Chen, Hangzhou (CN); Chen Wu, Hangzhou (CN); Xinhua Wang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/728,149

(22) Filed: Apr. 25, 2022

(65) Prior Publication Data

US 2022/0344081 A1 Oct. 27, 2022

(30) Foreign Application Priority Data

Apr. 26, 2021 (CN) ......................... 202110451874.9

(51) Int. Cl.
*H01F 1/057* (2006.01)
*H01F 1/055* (2006.01)
*H01F 7/02* (2006.01)

(52) U.S. Cl.
CPC ........... *H01F 1/057* (2013.01); *H01F 1/0557* (2013.01); *H01F 7/02* (2013.01)

(58) Field of Classification Search
None
See application file for complete search history.

(56) References Cited

FOREIGN PATENT DOCUMENTS

| | | | | |
|---|---|---|---|---|
| CN | 104388951 A | * | 3/2015 | |
| CN | 108154986 A | * | 6/2018 | ........... H01F 1/0573 |
| CN | 110133029 A | * | 8/2019 | ............. C23C 14/35 |

OTHER PUBLICATIONS

Machine translation of CN 108154986A. (Year: 2018).*
Machine translation of CN104388951A. (Year: 2015).*
Machine translation of CN110133029A. (Year: 2019).*

* cited by examiner

*Primary Examiner* — Xiaowei Su

(57) ABSTRACT

A method for improving magnetic properties of a Ce—Y-rich rare earth permanent magnet is provided, and the Ce—Y-rich rare earth permanent magnet is subjected to pressurized heat treatment to improve magnetic properties. The method includes: preparing a pristine magnet through a sintering process; and placing the pristine magnet into a pressurized heat treatment device and performing pressurized heat treatment under the protection of an argon atmosphere. By regulating parameters such as pressure, temperature and holding time in the heat treatment process, element diffusion in the Ce—Y-rich permanent magnet is promoted, and coercivity, remanence, magnetic energy product and temperature stability of the Ce—Y-rich permanent magnet are improved. The method has advantages of a simple process with low energy consumption, a substitution amount of rare earths Ce—Y up to 90 wt % while having excellent magnetic performance, so that a way for efficient utilization of high-abundance rare earths Ce and Y is provided.

2 Claims, No Drawings

METHOD FOR IMPROVING MAGNETIC PROPERTIES OF CERIUM-YTTRIUM-RICH RARE EARTH PERMANENT MAGNET

CROSS-REFERENCE TO RELATED APPLICATION

This application claims a priority to a Chinese patent application No. 202110451874.9 filed to the China National Intellectual Property Administration on Apr. 26, 2021. The entire content of the above-mentioned application is hereby incorporated by reference in its entirety.

TECHNICAL FIELD

The present disclosure relates to the field of rare earth permanent magnets, in particular to a method for improving magnetic properties of a cerium-yttrium-rich (Ce—Y-rich) rare earth permanent magnet.

BACKGROUND

Neodymium-iron-boron (Nd—Fe—B) is known as the "king of magnetism", and has superior magnetic performance than other permanent magnets. Therefore, it is widely used in the fields of energy, information, transportation and national defense, and is one of key basic materials for national economy and national defense construction. With social development and technological progress, the demand for Nd—Fe—B increases year by year, the consumption of rare earth resources is too fast, the price of rare earths is rising, and the sustainable development of global rare earth industry is facing a severe challenge. In addition, the utilization of rare earth resources is also unbalanced, since the rare earth resources such as Nd/Pr/Dy/Tb with limited reserves in the earth's crust are heavily consumed, while the high-abundance rare earth elements Ce and Y are rarely used in the field of rare earth permanent magnets. The application of inexpensive high-abundance rare earths Ce and Y to substitute expensive Nd/Pr/Dy/Tb can significantly reduce the raw material cost of rare earth permanent magnets and balance the utilization of rare earth resources.

In a sintered magnet, Ce and Y elements can form stable 2:14:1 phase, but at the cost of intrinsic magnetic properties. For example, the intrinsic magnetic properties of $Ce_2Fe_{14}B$ (saturation magnetic polarization $J_S$=1.17 T, and magnetocrystalline anisotropy field $H_A$=26 kOe) and $Y_2Fe_{14}B$ ($J_S$=1.41 T, and $H_A$=26 kOe) are lower than those of $Nd_2Fe_{14}B$ ($J_S$=1.60 T, and $H_A$=73 kOe). Therefore, after the substitution of Nd by Ce—Y, the magnetic dilution effect of the rare earth permanent magnet is severe and the magnetic properties are significantly deteriorated. Accordingly, how to improve the magnetic properties has become a major bottleneck limiting the industrialization of Ce—Y-rich rare earth permanent magnet.

A Chinese patent publication No. CN107275027A discloses a Ce-rich rare earth permanent magnet with yttrium (Y) and its preparation method. In which, a RE-Fe—B main phase and one or more Ce-rich main phases with Y addition are designed. Alloy powders of the two kinds of main phases are mixed in proportion, pressed, sintered and heat treated to finally prepare a rare earth permanent magnet with a multi-main phase structure, which can alleviate the magnetic dilution effect caused by the Ce—Y substitution. However, the magnetic dilution effect in the sintered magnet with high Ce—Y substitution is still very significant, which is difficult to meet the commercial demand. For the sintered magnet, a heat treatment process is often needed to further enhance the coercivity. However, in the sintered magnet with co-substitution of multiple high-abundance rare earths, the diffusion of elements such as Ce, Y and Nd is more complex and there exists newly formed grain boundary phases, which pose rigid requirements for the heat treatment.

SUMMARY

According to the present disclosure, a pristine magnet rich in Ce—Y is prepared through a sintering process. Meanwhile the ratio and substitution level of Ce and Y are regulated. Therefore the synergistic effect of multiple rare earth elements in a heat treatment process is fully exploited, where the Y and Nd infiltrate into a main phase while the Ce is promoted to migrate to a grain boundary phase. Moreover, a certain pressure is applied in the heat treatment process, which can reduce the temperature of heat treatment while kinetically promoting the diffusion and migration of elements, and ultimately improve the coercivity, remanence, magnetic energy product and temperature stability of the Ce—Y-rich rare earth permanent magnet.

In order to achieve the above-mentioned objective, a technical solution proposed by the present disclosure is a method for improving magnetic properties of a Ce—Y-rich rare earth permanent magnet, which include:

(1) preparing a pristine magnet by a sintering process, wherein the pristine magnet is rich in high-abundance rare earth Ce—Y, and includes components, in mass percent, of $[(Y_aCe_{1-a})_bRE_{1-b}]_cFe_{100-c-d-e}M_dB_e$, where Y is yttrium element, Ce is cerium element, RE is one or more selected from the group consisting of neodymium (Nd), praseodymium (Pr), gadolinium (Gd) and holmium (Ho), Fe is iron element, M is one or more selected from the group consisting of aluminum (Al), cobalt (Co), chromium (Cr), copper (Cu), gallium (Ga), manganese (Mn), molybdenum (Mo), niobium (Nb), nickel (Ni), silicon (Si), tantalum (Ta), titanium (Ti), vanadium (V) and zirconium (Zr), B is boron element, and a, b, c, d, e satisfy relationships that 0.3≤a≤0.7, 0.4≤b≤0.9, 26≤c≤34, 0.5≤d≤2, and 0.85≤e≤1.15;

(2) placing the pristine magnet into a pressurized heat treatment device, vacuumizing to a vacuum degree less than $10^{-3}$ Pa, introducing argon for protection and performing pressurized heat treatment with a heat treatment temperature in a range of 400~800 degrees Celsius (° C.), an applied pressure in a range of 0.5~10 MPa and a heat preservation time in a range of 3~40 hours (h), to obtain a resultant magnet.

In an embodiment, the high-abundance rare earths Ce—Y are 40%~90% in mass percent of total rare earths in the pristine magnet.

Compared with the related art, the present disclosure may have beneficial effects as follows.

1) According to the present disclosure, a ratio of Ce to Y is adjusted to be 7:3~3:7, and a mass percentage of Ce—Y is adjusted to be 40%~90% of total rare earths in the pristine magnet, through the substitution of different rare earth elements and the preferential selection of the alloying element M. The synergistic effect of Ce—Y in the heat treatment process is fully exploited, so that the Y and Nd infiltrate into a main phase while the Ce is promoted to migrate to a grain boundary phase, which can alleviate the magnetic dilution effect caused by Ce—Y co-substitution.

2) According to the present disclosure, the pressurized heat treatment process is used, for the scheme of the substitution of different rare earth elements, the element diffusion rate, migration law, grain growth, magnetic evolution of grain boundary phase, etc. are controlled by adjusting the pressure, temperature and heat preservation time (also referred to as holding time), and the pressurization can also further reduce the required heat treatment temperature.

3) Conventional heat treatment can improve the coercivity of a sintered magnet, but cannot improve the remanence and magnetic energy product. By regulating the migration of rare earth elements, the pressurized heat treatment process according to the present disclosure can increase the substitution levels of Y, Nd and the like while reduce the content of Ce in the main phase of the Ce—Y-rich permanent magnet, thereby significantly improving the remanence and magnetic energy product of the magnet. In addition, since Ce enters the grain boundary phase, the fraction, morphology and distribution of the grain boundary phase can be further adjusted, and the coercivity of the magnet can be significantly increased. Meanwhile, the higher Y content in the main phase can enhance the temperature stability of the Ce—Y-rich permanent magnet.

4) Compared with other pressurized diffusion and heat treatment methods, the present disclosure does not introduce additional diffusion sources, and uses the synergistic effect of multiple rare earth elements to promote element diffusion to achieve improvement of properties. Moreover, for the Ce—Y-rich sintered magnet according to the present disclosure, only a small pressure (0.5~10 MPa) is required to achieve the purpose of promoting the element diffusion in the magnet, and the energy consumption is lower.

DETAILED DESCRIPTION OF EMBODIMENTS

The present disclosure will be further described in combination with concrete embodiments, but the present disclosure is not limited to the following embodiments.

Embodiment 1

A pristine magnet of $[Y_{0.3}Ce_{0.7})_{0.5}Nd_{0.5}]_{30.5}Fe_{67.11}Co_{1.1}Al_{0.2}Zr_{0.09}B_1$ rich in Ce—Y is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 800° C., the applied pressure is 0.5 MPa, and the heat preservation time is 8 h. For the resultant magnet, magnetic properties are $B_r$=12.9 kG, $H_{cj}$=11.4 kOe, $(BH)_{max}$=38.3 MGOe.

Comparative Embodiment 1

A pristine magnet of $[(Y_{0.3}Ce_{0.7})_{0.5}Nd_{0.5}]_{30.5}Fe_{67.11}Co_{1.1}Al_{0.2}Zr_{0.09}B_1$ rich in Ce—Y is prepared by a sintering process, and subsequently the pristine magnet is placed into a normal pressure heat treatment device. It is vacuumized to a vacuum degree less than $10^{-3}$ Pa, and then argon is introduced as a protective gas to perform normal pressure heat treatment to obtain a resultant magnet. The heat treatment temperature is 800° C., and the heat preservation time is 8 h. For the resultant magnet, magnetic properties are $B_r$=12.6 kG, $H_{cj}$=8.9 kOe, $(BH)_{max}$=36.1 MGOe.

Embodiment 2

A pristine magnet of $[(Y_{0.4}Ce_{0.6})_{0.5}Nd_{0.5}]_{30.5}Fe_{67.11}Co_{0.8}Cu_{0.2}Al_{0.25}Zr_{0.14}B_1$ rich in Ce—Y is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 500° C., the applied pressure is 3 MPa, and the heat preservation time is 4 h. For the resultant magnet, magnetic properties are $B_r$=13.1 kG, $H_{cj}$=11.6 kOe, $(BH)_{max}$=41.1 MGOe.

Comparative Embodiment 2

A pristine magnet of $[(Y_{0.4}Ce_{0.6})_{0.5}Nd_{0.5}]_{30.5}Fe_{67.11}Co_{0.8}Cu_{0.2}Al_{0.25}Zr_{0.14}B_1$ rich in Ce—Y is prepared by a sintering process, and subsequently the pristine magnet is placed into a normal pressure heat treatment device. It is vacuumized to a vacuum degree less than $10^{-3}$ Pa, and then argon is introduced as a protective gas to perform normal pressure heat treatment to obtain a resultant magnet. The heat treatment temperature is 500° C., and the heat preservation time is 4 h. For the resultant magnet, magnetic properties are $B_r$=12.8 kG, $H_{cj}$=9.0 kOe, $(BH)_{max}$=38.3 MGOe.

Embodiment 3

A pristine magnet of $[(Y_{0.4}Ce_{0.6})_{0.7}Nd_{0.3}]_{31}Fe_{66.45}Co_{0.8}Al_{0.2}Ga_{0.25}Cu_{0.25}Nb_{0.1}B_{0.95}$ rich in Ce—Y is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 400° C., the applied pressure is 0.8 MPa, and the heat preservation time is 10 h. For the resultant magnet, magnetic properties are $B_r$=12.3 kG, $H_{cj}$=9.1 kOe, $(BH)_{max}$=35.8 MGOe.

Comparative Embodiment 3

A pristine magnet of $(Ce_{0.7}Nd_{0.3})_{31}Fe_{66.45}Co_{0.8}Al_{0.2}Ga_{0.25}Cu_{0.25}Nb_{0.1}B_{0.95}$ rich in Ce is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 400° C., the applied pressure is 0.8 MPa, and the heat preservation time is 10 h. For the resultant magnet, magnetic properties are $B_r$=12.0 kG, $H_{cj}$=6.7 kOe, $(BH)_{max}$=32.9 MGOe.

Embodiment 4

A pristine magnet of $[Y_{0.7}Ce_{0.3})_{0.4}Nd_{0.43}Pr_{0.12}Gd_{0.05}]_{31.0}Fe_{67.01}Co_{0.39}Cu_{0.15}Al_{0.15}Ga_{0.2}Nb_{0.1}B_1$ rich in Ce—Y is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 650° C., the applied pressure is 10 MPa, and the heat preservation time is 3 h. For the resultant magnet, magnetic properties are $B_r$=13.4 kG, $H_{cj}$=12.8 kOe, $(BH)_{max}$=43.5 MGOe.

Comparative Embodiment 4

A pristine magnet of $[(Y_{0.2}Ce_{0.8})_{0.4}Nd_{0.43}Pr_{0.12}Gd_{0.05}]_{31.0}Fe_{67.01}Co_{0.39}Cu_{0.15}Al_{0.15}Ga_{0.2}Nb_{0.1}B_1$ rich in Ce—Y is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 650° C., the applied pressure is 10 MPa, and the heat preservation time is 3 h. For the resultant magnet, magnetic properties are $B_r$=13.0 kG, $H_{cj}$=10.8 kOe, $(BH)_{max}$=41.3 MGOe.

Embodiment 5

A pristine magnet of $[(Y_{0.3}Ce_{0.7})_{0.9}Pr_{0.1}]_{31}Fe_{66.39}Co_{0.5}Zr_{0.15}Al_{0.3}Ga_{0.5}Cu_{0.25}B_{0.91}$ rich in Ce—Y is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 480° C., the applied pressure is 3 MPa, and the heat preservation time is 3.5 h. For the resultant magnet, magnetic properties are that $B_r$=11.6 kG, $H_{cj}$=6.1 kOe, $(BH)_{max}$=30.1 MGOe.

Comparative Embodiment 5

A pristine magnet of $(Ce_{0.9}Pr_{0.1})_{31}Fe_{66.39}Co_{0.5}Zr_{0.15}Al_{0.3}Ga_{0.5}Cu_{0.25}B_{0.91}$ rich in Ce is prepared by a sintering process, and subsequently the pristine magnet is placed into a pressurized heat treatment device. It is vacuumized to a vacuum degree less than $10^{-3}$ Pa, and then argon is introduced as a protective gas to perform pressurized heat treatment to obtain a resultant magnet. The heat treatment temperature is 480° C., the applied pressure is 3 MPa, and the heat preservation time is 3.5 h. For the resultant magnet, magnetic properties are $B_r$=11.3 kG, $H_{cj}$=5.1 kOe, $(BH)_{max}$=27.1 MGOe.

As seen from the above embodiments and comparative embodiments, it can be found that by the pressurized heat treatment on the Ce—Y-rich rare earth permanent magnet, the synergistic diffusion effect of rare earth elements such as Ce, Y and Nd in the pressurized heat treatment process can be fully exploited, so that a method for improving remanence, coercivity and magnetic energy product is realized, which is creative invention of the inventors obtained by summarization and theoretical calculation after a large number of experiments. The conditions associated with the present disclosure are that: the ratio of Ce to Y meets a composition range of 7:3~3:7, the mass percentage of Ce—Y in the total rare earths is required to be 40%~90%, the applied pressure in the heat treatment process is in a range of 0.5~10 MPa, and cooperating with the heat treatment temperature, the holding time and the composition, to realize the goal of improving magnetic properties. The properties of the prepared magnet are much better than that of the Ce—Y-rich magnet which meets the composition range but is subject to the normal pressure heat treatment, and also better than that of the magnet which meets the pressurized heat treatment process conditions but does not match the composition range. The technical features and effects of the present disclosure are apparently different from that of traditional Ce—Y-rich sintered, hot-pressed or hot-deformed magnets, and thus substantial innovation and progress are achieved.

What is claimed is:

1. A method of preparing a cerium-yttrium-rich (Ce—Y-rich) permanent magnet, comprising:

preparing an initial magnet through a sintering process, wherein the initial magnet is composed of yttrium (Y), cerium (Ce), iron (Fe), boron (B), a RE element and an M element, wherein:

the RE element is selected from the group consisting of neodymium (Nd), praseodymium (Pr), gadolinium (Gd), holmium (Ho) and a combination thereof;

the M element is selected from the group consisting of aluminum (Al); cobalt (Co), chromium (Cr), copper (Cu), gallium (Ga), manganese (Mn), molybdenum (Mo), niobium (Nb), nickel (Ni), silicon (Si), tantalum (Ta), titanium (Ti), vanadium (V), zirconium (Zr) and a combination thereof;

based on the initial magnet, a total of rare earths Y, Ce and the RE element is 30.5-31 mass %, the M element is 0.5-2 mass %, and B is 0.85-1.15 mass %; and a mass ratio of Y to Ce is a: 1-a, and a mass ratio of a combination of Ce and Y (Ce—Y) to the RE element is b: 1-b, wherein 0.3≤a≤0.7, 0.4≤b≤0.9;

placing the initial magnet into a pressurized heat treatment device under a vacuum degree less than $10^{-3}$ Pa;

introducing an argon gas into the pressurized heat treatment device; and performing without introducing an additional diffusion source, in the pressurized heat treatment device, a pressurized heat treatment on the initial magnet at a temperature of 400-800° C. for 3-10 hours under a pressure of 0.5-10 MPa to produce the permanent magnet.

2. A method of preparing a cerium-yttrium-rich (Ce—Y-rich) permanent magnet, consisting of:

preparing an initial magnet through a sintering process, wherein the initial magnet is composed of yttrium (Y), cerium (Ce), iron (Fe), boron (B), a RE element and an M element, wherein:

the RE element is selected from the group consisting of neodymium (Nd), praseodymium (Pr), gadolinium (Gd), holmium (Ho) and a combination thereof;

the M element is selected from the group consisting of aluminum (Al); cobalt (Co), chromium (Cr), copper (Cu), gallium (Ga), manganese (Mn), molybdenum (Mo), niobium (Nb), nickel (Ni), silicon (Si), tantalum (Ta), titanium (Ti), vanadium (V), zirconium (Zr) and a combination thereof;

based on the initial magnet, a total of rare earths Y, Ce and the RE element is 30.5-31 mass %, the M element is 0.5-2 mass %, and B is 0.85-1.15 mass %; and a mass ratio of Y to Ce is a: 1-a, and a mass ratio of a combination of Ce and Y (Ce—Y) to the RE element is b: 1-b, wherein 0.33≤a≤0.7, 0.4≤b≤0.9; and performing a pressurized heat process on the initial magnet through steps consisting of:

placing the initial magnet into a pressurized heat treatment device under a vacuum degree less than $10^{-3}$ Pa;

introducing an argon gas into the pressurized heat treatment device; and performing, in the pressurized heat treatment device, a pressurized heat treatment on the initial magnet at a temperature of 400-800° C. for 3-10 hours under a pressure of 0.5-10 MPa to produce the permanent magnet.

* * * * *